United States Patent
Anderson (10) Patent No.: US 9,264,402 B2
(45) Date of Patent: Feb. 16, 2016

(54) SYSTEMS INVOLVING FIREWALL OF VIRTUAL MACHINE TRAFFIC AND METHODS OF PROCESSING INFORMATION ASSOCIATED WITH SAME

(71) Applicant: VIRTUSTREAM CANADA HOLDINGS, INC., Bethesda, MD (US)

(72) Inventor: Derek Anderson, Abbotsford (CA)

(73) Assignee: Virtustream Canada Holdings, Inc., Bethesda, MD (US)

(*) Notice: Subject to any disclaimer, the term of this patent is extended or adjusted under 35 U.S.C. 154(b) by 49 days.

(21) Appl. No.: 13/772,090

(22) Filed: Feb. 20, 2013

(65) Prior Publication Data

US 2013/0227674 A1 Aug. 29, 2013

Related U.S. Application Data

(60) Provisional application No. 61/600,816, filed on Feb. 20, 2012.

(51) Int. Cl.
*H04L 29/06* (2006.01)
*G06F 9/44* (2006.01)
*H04L 12/22* (2006.01)
*G06F 21/53* (2013.01)

(52) U.S. Cl.
CPC ............ *H04L 63/0227* (2013.01); *G06F 21/53* (2013.01); *H04L 63/1441* (2013.01); *H04L 63/20* (2013.01)

(58) Field of Classification Search
CPC . H04L 63/02; H04L 63/0209; H04L 63/0227; H04L 63/0236; H04L 63/0272; H04L 63/101; H04L 63/1441; H04L 63/20; H04L 47/10; H04L 45/00; G06F 9/45533; G06F 9/45595; G06F 21/55; G06F 21/577
See application file for complete search history.

(56) References Cited

U.S. PATENT DOCUMENTS

| 6,282,171 | B1* | 8/2001 | Adams et al. ................. 370/229 |
| 6,341,130 | B1* | 1/2002 | Lakshman et al. ............ 370/389 |
| 6,487,666 | B1* | 11/2002 | Shanklin et al. ................ 726/23 |
| 7,042,880 | B1* | 5/2006 | Voit et al. ................... 370/395.1 |

(Continued)

FOREIGN PATENT DOCUMENTS

KR 10-2011-0068308 6/2011

OTHER PUBLICATIONS

Laureano, "Intrusion Detection in Virtual Machine Environments", EUROMICRO '04 Proceedings of the 30th Euromicro Conference, IEEE Computer Society, 2004, pp. 520-525.*

(Continued)

*Primary Examiner* — Andrew Nalven
*Assistant Examiner* — Walter Malinowski
(74) *Attorney, Agent, or Firm* — DLA Piper LLP (US)

(57) ABSTRACT

Systems and methods involve compute nodes configured to define and/or otherwise process information associated with one or more virtual machines. In one exemplary implementation, a compute node may be configured to enable a firewall between the virtual machine and at least a portion of a network. Moreover, the firewall may be configured to detect undesired traffic based on a list of rules or an Ethernet bridge table associated with communication between the virtual machine and the network. Various features may also relate to the compute node being configured to lock the virtual machine in response to the firewall detecting undesired traffic associated with the virtual machine.

26 Claims, 6 Drawing Sheets

(56) References Cited

U.S. PATENT DOCUMENTS

| | | | |
|---|---|---|---|
| 8,140,313 B2 | 3/2012 | Drasny et al. | |
| 8,146,147 B2 | 3/2012 | Litvin et al. | |
| 8,239,608 B1* | 8/2012 | Ginzton | 711/6 |
| 8,261,317 B2 | 9/2012 | Litvin et al. | |
| 8,281,363 B1* | 10/2012 | Hernacki et al. | 726/2 |
| 8,336,094 B2 | 12/2012 | Litvin et al. | |
| 8,381,209 B2* | 2/2013 | Reumann | H04L 63/0263 709/250 |
| 8,612,744 B2* | 12/2013 | Shieh | H04L 67/00 713/153 |
| 8,799,422 B1* | 8/2014 | Qu et al. | 709/220 |
| 8,875,272 B2* | 10/2014 | Jansen | H04L 63/0281 713/152 |
| 2002/0010799 A1* | 1/2002 | Kubota et al. | 709/249 |
| 2002/0069369 A1* | 6/2002 | Tremain | 713/201 |
| 2003/0054818 A1* | 3/2003 | Bahl | H04W 88/06 455/432.1 |
| 2003/0115345 A1* | 6/2003 | Chien et al. | 709/229 |
| 2003/0118035 A1* | 6/2003 | Sharma et al. | 370/401 |
| 2004/0015579 A1* | 1/2004 | Cooper et al. | 709/223 |
| 2004/0100908 A1* | 5/2004 | Khosravi et al. | 370/235 |
| 2005/0086523 A1* | 4/2005 | Zimmer et al. | 713/201 |
| 2005/0157728 A1* | 7/2005 | Kawano et al. | 370/395.21 |
| 2005/0262556 A1* | 11/2005 | Waisman et al. | 726/22 |
| 2006/0098670 A1* | 5/2006 | Voit et al. | 370/401 |
| 2006/0112416 A1* | 5/2006 | Ohta et al. | 726/1 |
| 2006/0165108 A1* | 7/2006 | Uysal | 370/412 |
| 2007/0061492 A1* | 3/2007 | van Riel | 710/3 |
| 2007/0294416 A1* | 12/2007 | Agre et al. | 709/229 |
| 2008/0086435 A1* | 4/2008 | Chesla | 706/12 |
| 2008/0222309 A1* | 9/2008 | Shanbhogue | 709/250 |
| 2008/0289028 A1* | 11/2008 | Jansen et al. | 726/11 |
| 2008/0293494 A1* | 11/2008 | Adiraju et al. | 463/42 |
| 2009/0077632 A1* | 3/2009 | Carpenter et al. | 726/3 |
| 2009/0193390 A1 | 7/2009 | Drasny et al. | |
| 2009/0222542 A1* | 9/2009 | Miyajima | G06F 9/507 709/222 |
| 2009/0249438 A1 | 10/2009 | Litvin et al. | |
| 2009/0249470 A1 | 10/2009 | Litvin et al. | |
| 2009/0249471 A1 | 10/2009 | Litvin et al. | |
| 2009/0249472 A1* | 10/2009 | Litvin et al. | 726/14 |
| 2009/0254990 A1* | 10/2009 | McGee | 726/22 |
| 2009/0265756 A1* | 10/2009 | Zhang et al. | 726/1 |
| 2009/0300605 A1* | 12/2009 | Edwards et al. | 718/1 |
| 2010/0042988 A1* | 2/2010 | Lundin et al. | 717/176 |
| 2010/0107162 A1* | 4/2010 | Edwards | G06F 9/5077 718/1 |
| 2010/0107220 A1 | 4/2010 | Nguyen | |
| 2010/0251363 A1* | 9/2010 | Todorovic | 726/22 |
| 2010/0278189 A1* | 11/2010 | Soon | 370/412 |
| 2011/0023645 A1* | 2/2011 | Lee | 74/473.3 |
| 2011/0113472 A1* | 5/2011 | Fung | H04L 63/102 726/3 |
| 2011/0138441 A1* | 6/2011 | Neystadt et al. | 726/1 |
| 2011/0141124 A1 | 6/2011 | Halls et al. | |
| 2011/0145418 A1 | 6/2011 | Pratt et al. | |
| 2011/0145458 A1 | 6/2011 | Narasimhan | |
| 2011/0145819 A1 | 6/2011 | McKenzie et al. | |
| 2011/0145820 A1 | 6/2011 | Pratt et al. | |
| 2011/0145821 A1 | 6/2011 | Philipson et al. | |
| 2011/0145833 A1* | 6/2011 | De Los Reyes et al. | 718/106 |
| 2011/0145886 A1 | 6/2011 | McKenzie et al. | |
| 2011/0145916 A1 | 6/2011 | McKenzie et al. | |
| 2011/0239268 A1* | 9/2011 | Sharp et al. | 726/1 |
| 2011/0255538 A1* | 10/2011 | Srinivasan et al. | 370/392 |
| 2012/0167082 A1* | 6/2012 | Kumar et al. | 718/1 |
| 2012/0198441 A1* | 8/2012 | Mahdavi et al. | 718/1 |
| 2012/0210417 A1* | 8/2012 | Shieh | 726/12 |
| 2012/0222114 A1 | 8/2012 | Shanbhogue | |

OTHER PUBLICATIONS

Oxenhandler, Designing a Secure Local Area Network (2003) (DSLAN), SANS Institute, 2003, 17 pages.*

Gregory, "Converged Network Security for Dummies", Wiley Publishing, 2007, 52 pages.*

Casado, "Ethane: Taking Control of the Enterprise", SIGCOMM '07, Aug. 27-31, 2007, 12 pages.*

Jorissen, "Layer 2 security", www.booches.nl/2008/07/layer-2-security/, 5 pages, Jul. 6, 2008.*

Convery, "IPv6 and IPv4 Threat Comparison and Best-Practice Evaluation (v1.0)", 43 pages,Cisco Systems. [Online]. Available: http://seanconvery.com/v6-v4-threats.pdf. 2004.*

International Search Report issued in PCT/US2013/026929 dated Jun. 18, 2013.

English Language Translation of KR 10-2011-0068308 pblished Jun. 22, 2011.

International Preliminary Report on Patentability issued in International Application No. PCT/US/2013/026929 dated Aug. 26, 2014.

Extended European Search Report issued in EP 13751206.7 dated Oct. 5, 2015.

* cited by examiner

SYSTEMS INVOLVING FIREWALL OF VIRTUAL MACHINE TRAFFIC AND METHODS OF PROCESSING INFORMATION ASSOCIATED WITH SAME

CROSS-REFERENCE TO RELATED APPLICATIONS

This application is based on and derives the benefit of the filing date of U.S. Provisional Patent Application No. 61/600,816, filed Feb. 20, 2012. The entire content of this application is herein incorporated by reference in its entirety.

FIELD

The present disclosure is directed generally to systems and methods involving firewall of virtual machine traffic.

BRIEF DESCRIPTION OF THE FIGURES

The accompanying drawings, which constitute a part of this specification, illustrate various implementations and aspects of the innovations herein and, together with the description, help illustrate the principles of the present inventions. In the drawings.

DETAILED DESCRIPTION OF ILLUSTRATIVE IMPLEMENTATIONS

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present innovations. Wherever possible, the same reference numbers will be used throughout the drawings to refer to the same or like parts.

According to aspects of the present innovations, systems herein may relate to an apparatus including a compute node configured to define and/or perform processing in connection with a virtual machine. The compute node may be configured to enable a firewall between the virtual machine and at least a portion of a network. The firewall may be configured, for example, to detect undesired traffic such as malicious or spoof attacks based on rules such as an in Ethernet bridge table associated with communication between the virtual machine and the at least a portion of the network. As used herein, Ethernet bridge tables (or ebtable) comprise one or more firewall processes, components and/or list of rules which apply a set of configurable rules to inspect, modify, re-route, discard, or otherwise inspect and/or modify the traffic which is being transferred at the data link layer of the networking stack. Such modification and inspection may include changes which affect the higher layers of the networking stack, such as the higher layers routing, source and/or target addresses or any other packet contents as they are exchanged on the network or received or transmitted to or from any network in the system. While the above may be performed via an 'Ethernet bridge table' per se, other implementations herein may perform such processing via a more generic 'list of rules'. After such detection, in some implementations, the compute node may be configured to lock the virtual machine in response to the firewall detecting a spoof attack by the virtual machine.

According to other aspects of the present innovations, methods herein may relate to processing information regarding compute nodes and associated firewalls configured to detect and prevent undesired traffic involving one or more networks.

Figure 1:
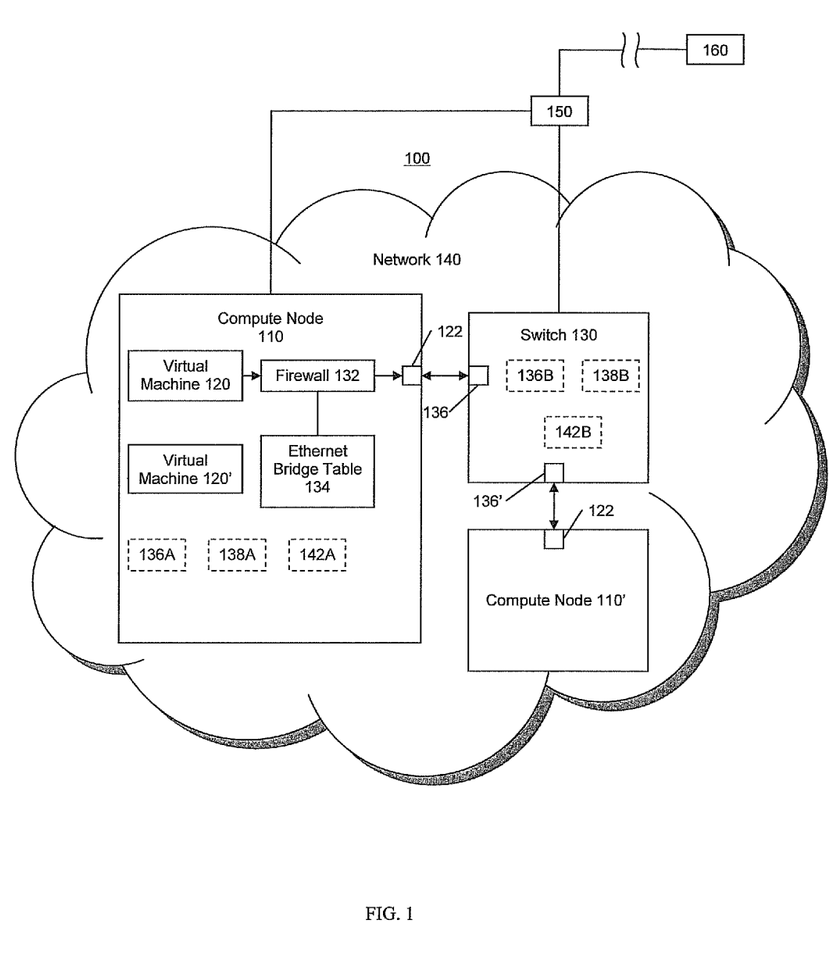
FIG. 1 is a block diagram of a virtual machine firewall system, according to a disclosed implementation.

As set forth below, virtual machine firewall systems and methods herein may be utilized to lock a virtual machine and/or stop or block traffic from a virtual machine to a network. FIG. 1 depicts a block diagram of an illustrative virtual machine firewall system 100. System 100 includes a compute node 110 including a virtual machine 120, a virtual machine 120', a firewall 132, and an Ethernet bridge table 134, a switch 130, a compute node 110', a network 140, a network administrator component 150, and a management component 160. According to implementations herein, compute node 110 may be configured to define virtual machine 120 and to enable the firewall 132.

Compute node 110 may be any type of device configured to send data within network 140 and/or out of network 140, and/or receive data from within network 140 and/or out of network 140. In some implementations, compute node 110 may be configured to function as, for example, a virtual machine host, a server device (e.g., a web server device), a network management device, a data repository and/or the like. Compute node 110 is configured to add, remove, lock, revise and/or edit a virtual machine and/or a firewall based on a command, instruction, and/or other indication received from a another compute node, a network administrator device 150, or a firewall and/or switch 130. Specifically, compute node 110 may be configured to define virtual machine 120 based on a command from, for example a network administrator device 150. Compute node 110 may enable and or define firewall 132 on switch 130, or may instruct switch 130 to enable, and/or otherwise define firewall 132. Compute node 110 includes a physical port 122 configured to operatively couple compute node 110 to switch 130. Physical port 122 may include any number of virtual ports to operatively couple components of compute node 110 to switch 130. In such implementations, firewall 132 may be operatively coupled to switch 130 via a virtual port of physical port 122.

Consistent with various implementations herein, compute node 110 may include at least one memory 136A, one or more processors/processing elements 138A, and/or other components 142A. The memory 136A may be, for example, a random access memory (RAM), a memory buffer, a hard drive, a database, an erasable programmable read-only memory (EPROM), an electrically erasable read-only memory (EEPROM), a read-only memory (ROM) and/or so forth. In some implementations, the memory 136A of compute node 110 includes data used to define virtual machine and or enable firewalls. In some implementations, the memory stores instructions to cause the processor to execute modules, processes and/or functions associated with system 100.

The processor(s) 138A of compute node 110 may be any suitable processing device configured to run and/or execute system 100. In some implementations, such a processor may be a general purpose processor, a Field Programmable Gate Array (FPGA), an Application Specific Integrated Circuit (ASIC), a Digital Signal Processor (DSP), and/or the like. Further, the processor may be configured to execute modules, functions and/or processes to operate system 100.

In some implementations, compute node 110 and compute node 110' may operate software and/or hardware elements configured to define a manager-agent relationship. In such implementations, compute node 110' may operate manager software and/or hardware, such as, for example, a program configured to enable a customer, a network administrator 150 and/or other management component 160 to request and/or provision virtual machines within network 140. In those implementations, compute node 110 may operate agent software and/or hardware, such as, for example, a program configured to enable a compute node to define virtual machine, firewalls, tables, etc. Such elements may be embodied via other components 142A or be distributed in and/or among various other locations in the system. Alternately, entities such as a network administrator 150, a management component 160 and the like located beyond the network may be configured to perform (or process information related to performing) the various management or other innovative features set forth herein, either in the context of such manager-agent relationship or otherwise.

Referring to the illustrative system of FIG. 1, compute node 110 is operatively coupled to switch 130. Switch 130 may be configured to couple compute node 110 to one or more other compute nodes and/or communication devices within network 140, and/or to couple compute node 110 to one or more compute nodes and/or communication devices within another network. In such manner, switch 130 may be configured to operatively couple virtual machine 120 to other virtual machines disposed on any number of other compute nodes and/or communication devices within network 140 or within another network. Switch 130 may include a physical port 136 configured to operatively couple compute node 110 to switch 130, and may include a virtual port (not shown) configured to couple components of compute node 110, for example virtual machine 120, via a firewall 132 to the switch 130.

Compute node 110 includes one or more Ethernet bridge table(s) 134. Here, for example, an Ethernet bridge table 134 may include forwarding data associated with communication between compute node 110, and virtual machine 120, and other compute nodes, and virtual machine associate with those compute nodes, operatively coupled to switch 130 via a physical port and/or virtual port. In some implementations, Ethernet bridge table 134 may be defined and/or populated by, for example, snooping on flood traffic within network 140. In some implementations, compute node 110 may include a software-based bridge and/or switch that may be configured to include or access Ethernet bridge table 134. In such implementations, the bridge and/or switch may be configured to forward, but not route, packets.

Compute node 110 may also include some or all of the firewall 132. Further, here, firewall 132 may be a combination of hardware and/or software (e.g., stored in memory and/or executing on a processor) configured to (1) monitor traffic through switch 130, (2) detect undesired traffic such as malicious traffic, spoof attacks, misconfigured or failing virtual machines, etc. and/or (3) block traffic from a source and/or to a destination in accordance with Ethernet bridge table 134. As used herein, undesired traffic refers to traffic that is to be disallowed for one or more reasons such as that the traffic is malicious (e.g., spoof attacks, etc.) and/or is a result of virtual machines that are misconfigure, failing or malfunctioning. Examples of the latter include, among other things, overly chatty logging systems, disallowed protocols such as bit-torrent, and misconfigured virtual machines that are sending invalid packets or flooding the network.

Firewall 132 may be a stateless firewall, for example a firewall that does not maintain state information during an active session. Firewall 132 may also be configured to lock virtual machine 120 automatically in response to a detected undesired traffic from virtual machine 120, and/or may be configured to lock virtual machine 120 in response to a command from compute node 110 in response to a detected attack from virtual machine 120. According to various implementations of the present inventions, firewall 132 may be configured to detect various specific malicious traffic, for example, media access control (MAC) spoofing, internet protocol (IP) address spoofing, dynamic host configuration protocol (DHCP) spoofing, rogue DHCP servers, address resolution protocol (ARP) spoofing, ARP poisoning, and other related attacks. The process of defining firewall 132 may include defining Ethernet bridge table 134 such that only packets sent from the media access control (MAC) address of the virtual machine are allowed, in addition to broadcast packets. Firewall 132 may be configured to allow, for example, DHCP requests and virtual machine responses, and may be configured to drop and or otherwise block DHCP requests from the virtual machine. Firewall 132 may be configured to inspect DHCP packet headers to determine whether the address of the DHCP packet is valid. Firewall 132 may be configured to lock Ethernet bridge table 134 to only deliver packets to and from IP address associated with a valid DHCP address. In such implementations, firewall 132 may lock Ethernet bridge table 134 to only forward ARP packets from that IP address.

In various innovations herein, firewall 132 may be configured to monitor and/or otherwise filter traffic at the link layer, i.e. layer-2. According to some implementations, for example, firewall 132 may monitor and/or otherwise filter virtual machine traffic during forwarding, but prior to routing. In this manner, undesired traffic such as malicious attack traffic may be discarded at the virtual hardware level (e.g. the virtual machine level) prior to such traffic reaching switch 130, or even another virtual machine within compute node 110, such as virtual machine 120'. Firewall 132 may monitor and/or otherwise filter traffic at the link layer, e.g., prior to routing using link layer information, such as MAC address, or using other information, such as IP address, DHCP address, etc. by performing, for example, deep packet inspection. Firewall 132 may be configured to monitor traffic using a packet capture mechanism, such as, for example, a Linux Kernal pcap.

According to some implementations, switch 130 may comprise one or more memory 136B, processor 138B and/or other components 142B operable in connection or involved with the features and functionality set forth herein. Here, for example, such processor(s) 138B and memory 136B of switch 130 may be substantially similar to the processor and the memory of compute node 110, described above. In some implementations, the processor 138B of switch 130 may be configured to forward data, (e.g., data packets, cells, etc.), from the compute node 110 and/or the virtual machine 120 via the physical port and/or the virtual port to another compute node, other switch and/or network, and/or virtual machine via another physical port and/or virtual port. In such implementations, the processor 138B of switch 130 may reference Ethernet bridge table 134 that may be stored in the memory 136B of switch 130. The processor 138B of switch 130 may be configured to execute modules, functions and/or processes to forward data, define tables, and/or define and/or enable firewalls. The memory of switch 130 may store instructions to cause the processor to execute modules, processes and/or functions associated with switch 130.

Figure 2:
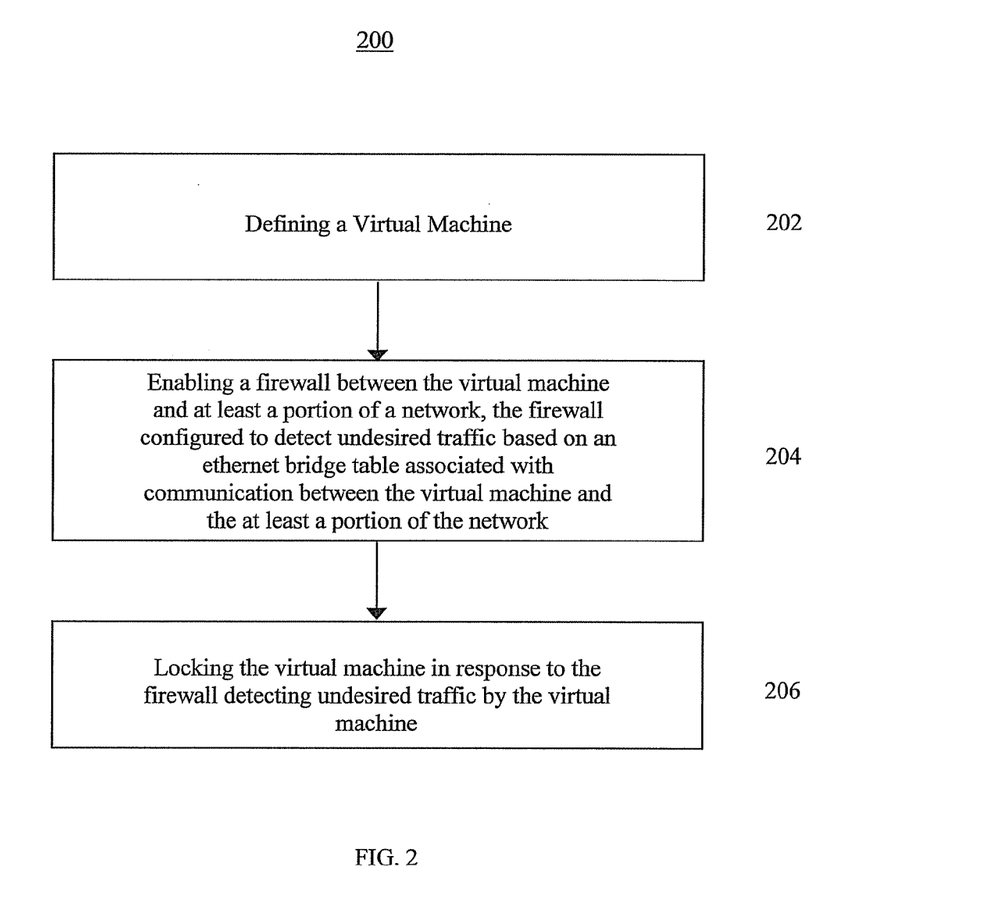
FIG. 2 is a flow chart depicting a method of operating a virtual machine firewall system, according to a disclosed implementation.

FIG. 2 depicts a flow chart of one method 200 of operation consistent with the system 100 depicted in FIG. 1. Referring to the exemplary implementation of FIG. 2, an illustrative method 200 may comprise defining a virtual machine, at 202. In some implementations, the compute node 110 may receive instruction(s) from one or more of a network administrator device 150, another compute node (110' or other), a management component 160, or the like, and in response to the instruction, define the virtual machine 120. Turning back to FIG. 2, the illustrated method 200 may then comprise enabling a firewall between the virtual machine and at least a portion of a network, the firewall configured to detect undesired traffic based on an Ethernet bridge table associated with communication between the virtual machine and the at least a portion of the network, at 204. In some implementations, compute node 110 may send an instruction to switch 130 to define and/or otherwise enable firewall 132. In such implementations, firewall 132 may be disposed logically between virtual machine 120 and other portions of network 140 and may detect undesired traffic and/or malicious attacks from virtual machine 120 based on Ethernet bridge table 134. In FIG. 2, the method 200 then comprises locking the virtual machine in response to the firewall detecting undesired traffic by the virtual machine, at 206. In some implementations, compute node 110 may receive an indication from the switch 130 and/or the firewall 132 that undesired traffic was detected from virtual machine 120, and may send an instruction to switch 130 and/or firewall 132 to lock virtual machine 120. In other implementations, switch 130 and/or firewall 132 may automatically lock virtual machine 120, and/or otherwise block traffic from firewall 132 when undesired traffic is detected.

Figure 3:
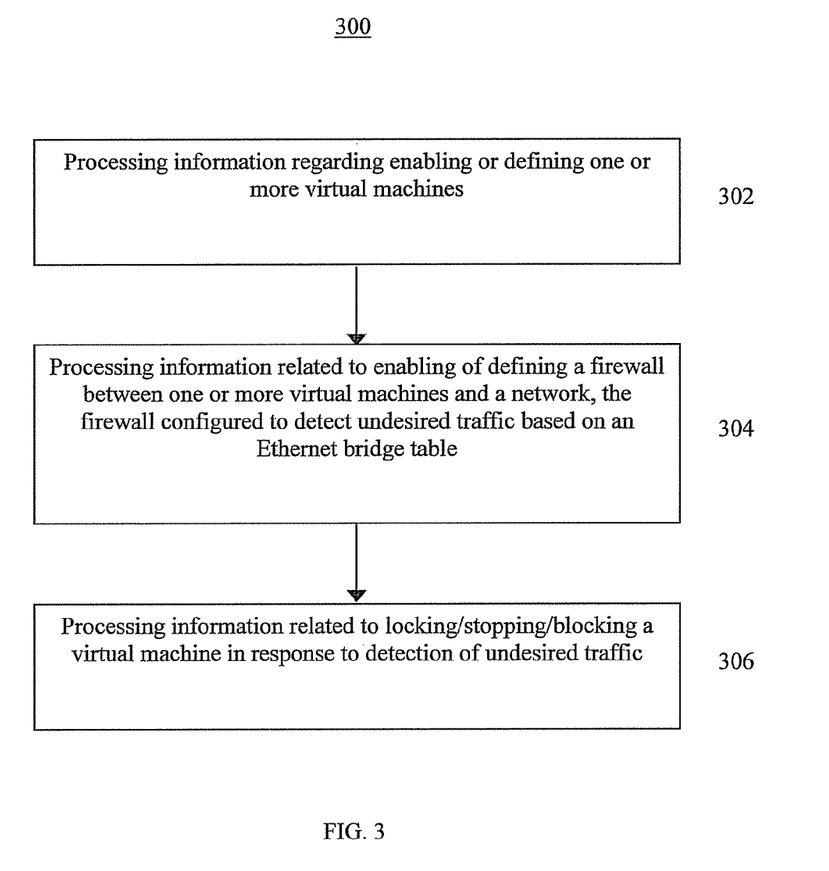
FIG. 3 is a flow chart depicting another method of operating a virtual machine firewall system, according to a disclosed implementation.

FIG. 3 is a flow chart depicting another method of operating a virtual machine firewall system, according to a disclosed implementation. In FIG. 3, as with other methods herein, processing related to performance of the method steps may be performed by among one or more of the various entities within the system. For example, the method steps or processing related thereto may be performed by one or more computer nodes 110, 110', one or more switches 130, one or more network administrator components 150, and/or one or more management components 160. According to the exemplary implementation shown in FIG. 3, an illustrative method may comprise processing information related to enabling or defining one or more virtual machines 302, processing information related to enabling or defining a firewall between one or more virtual machines and a network, the firewall configured to detect undesired traffic based on an Ethernet bridge table 304, and processing information related to locking/stopping/blocking a virtual machine in response to detection of the undesired traffic 306.

Figure 4:
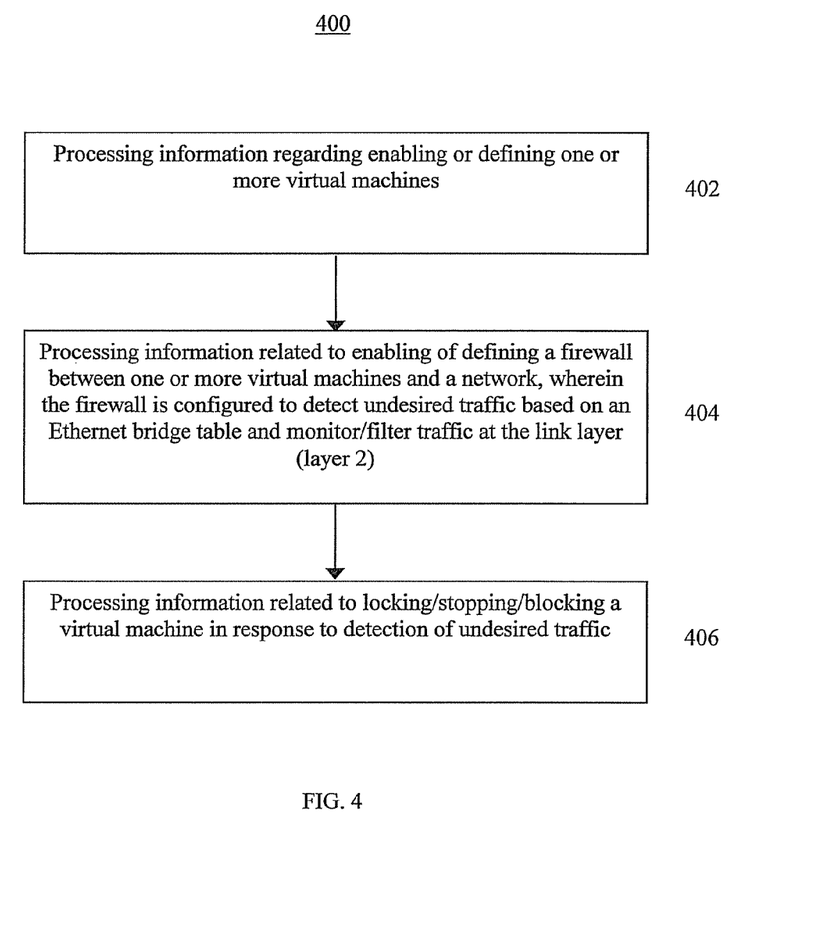
FIG. 4 is a flow chart depicting a further method of operating a virtual machine firewall system, according to a disclosed implementation.

FIG. 4 is a flow chart depicting a further method of operating a virtual machine firewall system, according to a disclosed implementation. In FIG. 4, as with other figures and processes herein, processing related to performance of the method steps may be performed by among one or more of the various entities within the system. For example, the method steps or processing related thereto may be performed by one or more computer nodes 110, 110', one or more switches 130, one or more network administrator components 150, and/or one or more management components 160. According to the exemplary implementation shown in FIG. 4, another illustrative method may comprise processing information related to enabling or defining one or more virtual machines 402, processing information related to enable a firewall between one or more virtual machines and a network, wherein the firewall is configured to detect undesired traffic based on an Ethernet bridge table and monitor/filter traffic at the link layer (layer 2) 404, and processing information related to locking/stopping/blocking a virtual machine in response to detection of the undesired traffic 406.

With regard to the monitoring/filtering of traffic, the firewall may be configured to monitor and/or otherwise filter traffic at the link layer (layer-2 or the data link layer, as set forth in the OSI model), such that the firewall may monitor and/or otherwise filter virtual machine traffic during forwarding, but prior to routing. Such monitoring and filtering at layer 2 prior to routing allows implementations herein to drop undesired or malicious traffic before it is received by any other network peers, such as compute nodes 110', 110', switches 130, or any other device attached, for example, to node 122 or network 140. Other benefits are achieved via such processing at the lowest level of communication above the actual physical links, where data is switched between peers on the same physical network, occurring below the TCP/IP networking layer. For example, layer 2 is inherently stateless, which means that implementations herein do not have to store/process details from packet to packet in order to maintain communications. Accordingly, these implementations do not need to maintain records of previous traffic in the same way as layer 3 communications must include recordation. Further, layer 2 packets may also be inspected to monitor their layer 3 contents, without needing to maintain state information, i.e., checking the headers to see the type of packet or the packet's source or destination. As such, undesired traffic may be advantageously discarded at the virtual hardware/machine level prior to the such traffic reaching a switch or another virtual machine within the compute node.

Figure 5:
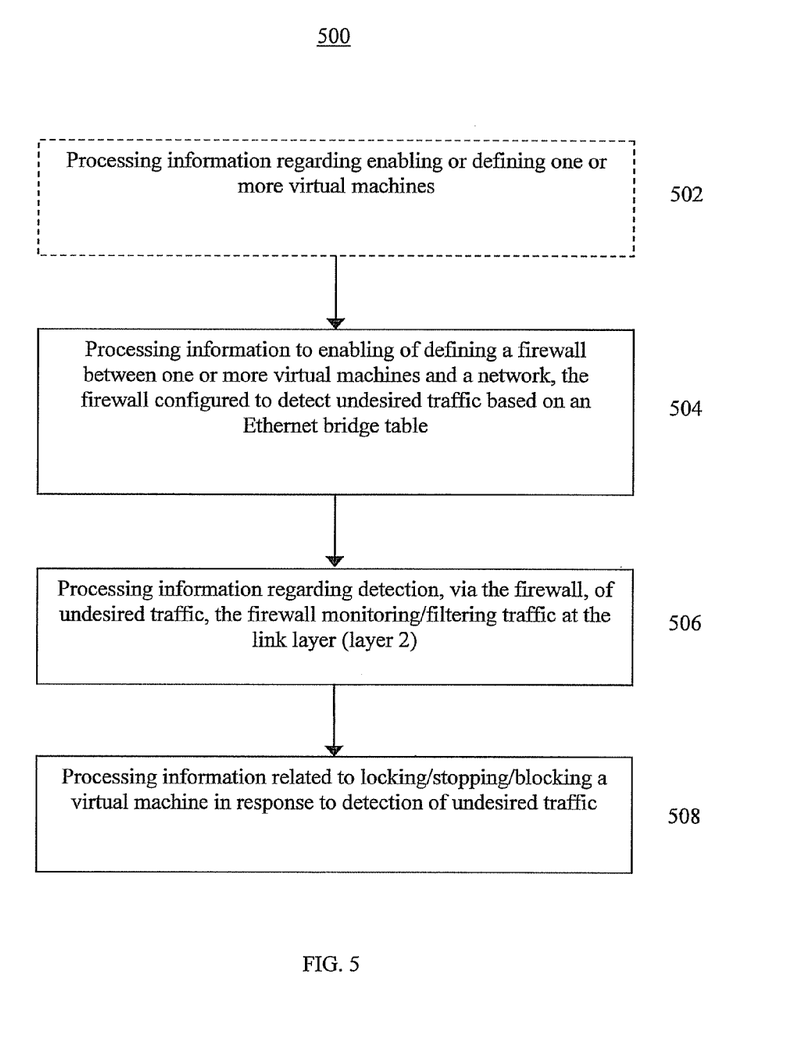
FIG. 5 is a flow chart depicting still another method of operating a virtual machine firewall system, according to a disclosed implementation.

FIG. 5 is a flow chart depicting still another method of operating a virtual machine firewall system, according to a disclosed implementation. According to the exemplary implementation shown in FIG. 5, another illustrative method may first comprise an optional step of processing information regarding enabling or defining one or more virtual machines 502. Here, for example, while a compute node 110, 110' may perform processing of such information in connection with the innovations herein, this initial processing (like other features and functionality herein) may also be previously performed and/or even by performed various other components such as a network administrator 150, a management component 160, etc. Turning back to FIG. 5, the method may then comprise processing information to enable a firewall between one or more virtual machines and a network, wherein the firewall is configured to detect undesired traffic based on an Ethernet bridge table 504, followed by processing information regarding detection, via the firewall, of undesired traffic, the firewall monitoring/filtering traffic at the link layer (layer 2) 506, and then processing information to lock/stop/block a virtual machine in response to detection of undesired traffic 508.

Figure 6:
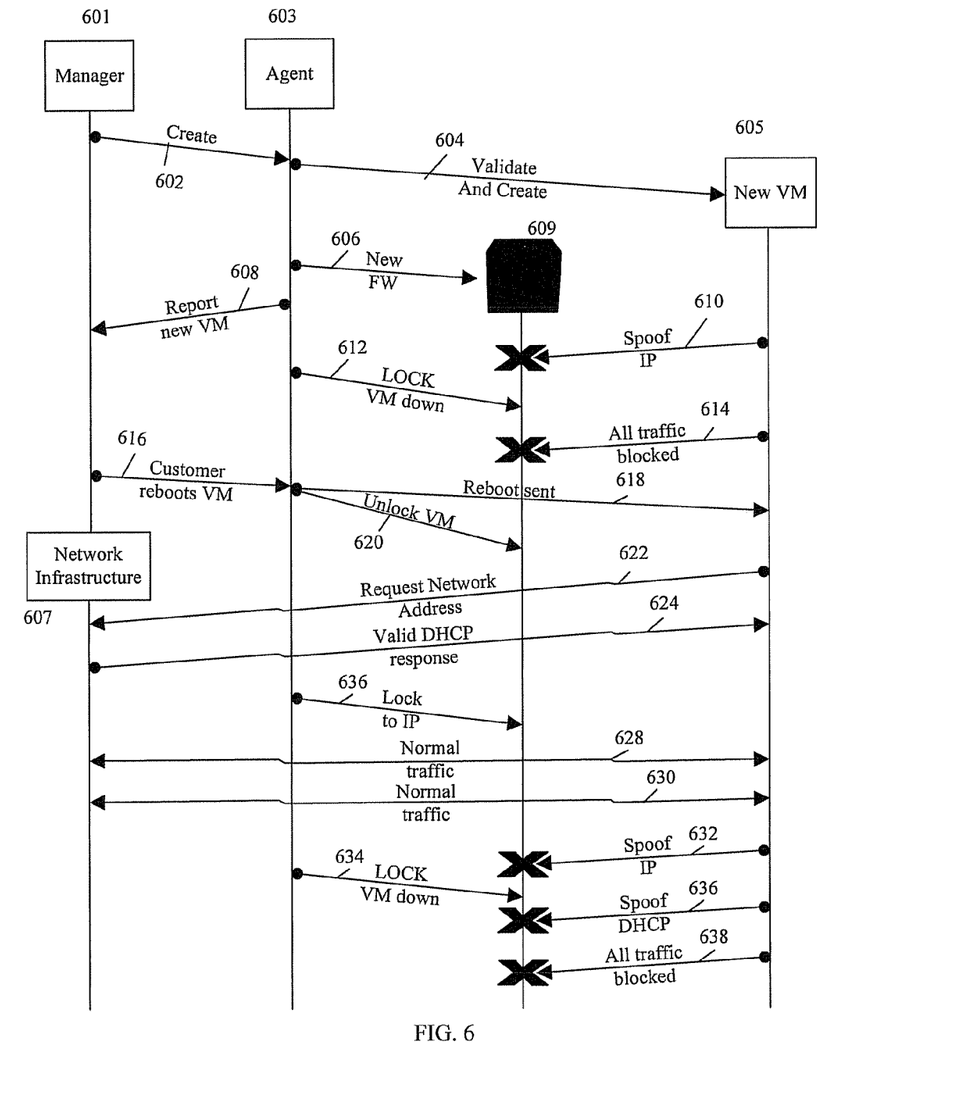
FIG. 6 is a flow chart depicting a method of operating a virtual machine firewall system according to an implementation.

FIG. 6 shows a representative flow/state diagram depicting illustrative processing associated with operating a virtual machine firewall system according to implementations herein. Process diagram 600 includes a first compute node (e.g., agent) 603 receiving an instruction from a second compute node (e.g. manager) 601 to define or otherwise boot a virtual machine (VM), at 602. Here, while shown in the drawing as separate, such manger and agent nodes may be or reside in the same physical node, or even be in the same process/software. The agent may validate the instruction from the manager and define the virtual machine, at 604. The virtual machine may then configure its networking, either by sending a request for a network address to a network and receiving a valid DHCP response, or by using predefined or dynamically generated configuration values.

The agent enables or otherwise defines a firewall (FW) 609 to monitor traffic from virtual machine, at 606. In some implementations, the agent may send an instruction or other indication to enable and/or otherwise define the firewall. The agent reports to the manager the definition of the virtual machine via an instruction or signal, at 608. In the example of FIG. 6, the virtual machine attempts a malicious attack, at 610. In this example, the malicious attack may be a spoof attack, specifically attempt to spoof the IP address of another compute node within the network. In such implementations, the firewall 609 may stop traffic associated with the spoof attack, for example data frames or cells that include a MAC address not associated with the virtual machine. In such implementations, the firewall detects the spoof attack and blocks the traffic associated with the spoof attack based on information included in an Ethernet bridge table of the agent. In other examples, the virtual machine may attempt any type of malicious attack. When the firewall detects a spoof attack, the agent sending an instruction to the firewall to lock the virtual machine, at 612, such that all traffic from the virtual machine is blocked, at 614.

According to additional implementations, the agent may then receive an instruction from the manager to reboot the virtual machine, at 616. In some implementations, the instruction from the manager may be based on a request from a customer or other user to reboot the virtual machine. The agent reboots the virtual machine, at 618, and sends an instruction to the firewall to unlock the virtual machine, at 620. The virtual machine sends a request for a network address to a network, at 622, and the virtual machine receives a valid DHCP response, at 624. The agent sends an instruction to the firewall to lock the IP address with the virtual machine, at 626. The virtual machine sends and receives traffic via the network, at 628 and 630, respectively.

In further processing shown in the example of FIG. 6, the virtual machine is shown attempting a malicious attack, for example an IP spoof attack, at 632. In such implementations, the firewall may stop traffic associated with the spoof attack, for example data frames or cells that include an IP address not associated with the virtual machine. In such implementations, the firewall detects the spoof attack and blocks the traffic associated with the spoof attack based on information included in an Ethernet bridge table of the agent. When the agent detects the spoof attack, the agent sends an instruction to the firewall to lock the virtual machine, at 634. In the example of FIG. 6, the virtual machine also attempts a second malicious attack, for example, a rogue DHCP attack, at 636. In such a rouge DHCP attack, the virtual machine may act like a DHCP server, and may attempt to send a DHCP request to the network infrastructure 607 via the firewall. In such a rogue DHCP attack, the firewall may stop traffic associated with the spoof attack, for example data frames or cells that include a DHCP offer. When the agent detects the malicious attack, the firewall may be configured or instructed to block all traffic from the virtual machine, at 638.

As used in this specification, the singular forms "a," "an" and "the" include plural referents unless the context clearly dictates otherwise. Thus, for example, the term "a firewall" is intended to mean a single firewall, or a combination of firewalls.

Some implementations described herein relate to a computer storage product with a computer-readable medium (also may be referred to as a processor-readable medium) having instructions or computer code thereon for performing various computer-implemented operations. The media and computer code (also may be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, implementations may be implemented using Java, C++, or other programming languages (e.g., object-oriented programming languages) and development tools. Additional examples of computer code include, but are not limited to, control signals, encrypted code, and compressed code.

While various implementations have been described above, it should be understood that they have been presented by way of example only, not limitation, and various changes in form and details may be made. Any portion of the apparatus and/or methods described herein may be combined in any combination, except mutually exclusive combinations. The implementations described herein may include various combinations and/or sub-combinations of the functions, components and/or features of the different implementations described. For example, while FIG. 1 depicts virtual machine 120 disposed in compute node 110, in some implementations, virtual machine 120 may be logically located within compute node 110 but physically located in another location. In some implementation, any attack may be substituted for a different attack. For example, while method 600 may include a DHCP attack at 636, in some implementation method 600 may include an ARP attack at 636.

Although certain presently disclosed implementations of the invention have been specifically described herein, it will be apparent to those skilled in the art to which the invention pertains that variations and modifications of the various implementations shown and described herein may be made without departing from the spirit and scope of the invention. Accordingly, it is intended that the claims and inventions herein be limited only to the extent required by the applicable rules of law.

The invention claimed is:

1. A method for handling traffic over a network regarding communications between one or more virtual machines and the network, the method comprising:
   enabling, via a compute node, a firewall between the one or more virtual machine and at least a portion of a network, the firewall configured to detect undesired traffic based on a list of rules associated with communication between the one or more virtual machines and the network; and controlling a virtual machine in response to the firewall detecting undesired traffic via monitoring and filtering traffic at layer 2 (link layer) during forwarding but prior to routing, including:
  detecting a spoof attack of an IP address of another compute node and blocking traffic having data frames or cells that include a MAC address not associated with the virtual machine based on information included in the list of rules;
  detecting a spoof attack of an IP address of another compute node and blocking traffic having data frames or cells that include an IP address not associated with the virtual machine based on information included in the list of rules;
  detecting a rogue dynamic host communication protocol (DHCP) attack and blocking traffic having data frames or cells that include a DHCP offer based on information included in the list of rules; and
  stopping the virtual machine and/or blocking all traffic from the virtual machine in response to the detecting of at least one attack;
performing processing regarding rebooting the virtual machine after detection of the undesired traffic, the processing including:
  processing an instruction to the firewall to restart the virtual machine;
  processing instructions regarding transmission, by the virtual machine, of a request for a network address to the network;
  processing information regarding receipt, by the virtual machine, of a valid response in reply to the request; and
  processing information regarding transmission, by an agent component, of an instruction to the firewall to lock the IP address with the virtual machine;
wherein the undesired traffic is discarded at the virtual hardware level prior to the undesired traffic reaching a switch or another virtual machine within the compute node;
wherein the list of rules includes forwarding data associated with communication between the compute node and the virtual machine as well as data associated with other compute node and other virtual machines associate with the other compute nodes;
wherein the firewall is configured to:
  allow DHCP requests and virtual machine responses;
  drop and or otherwise block DHCP requests from the virtual machine;
  inspect DHCP packet headers to determine whether the address of the DHCP packet is valid;
  lock the list of rules to only deliver packets to and from IP address associated with a valid DHCP address; and
  lock the list of rules to only forward ARP packets from an associated IP address.

2. The method of claim 1 further comprising enabling or defining a virtual machine.

3. The method of claim 1 wherein the controlling of the virtual machine includes one or both of:
  locking or blocking network traffic to and/or from the virtual machine at a host layer by shutting down a virtual Ethernet connection; and
  stopping traffic, via the firewall, associated with the undesired traffic, wherein the stopping traffic includes stopping data frames or cells that include a DHCP offer and/or a MAC address not associated with the virtual machine.

4. The method of claim 1 further comprising performing processing regarding the rebooting the virtual machine after detection of the undesired traffic, the processing further including:
  processing instruction(s) from a manager component to reboot the virtual machine; and
  rebooting the virtual machine.

5. The method of claim 1 further comprising performing processing to handle a rogue DHCP attack, the processing including:
  detecting, via an agent component, an attempt by the virtual machine to send a DHCP request to the network infrastructure via the firewall, wherein the virtual machine acts like a DHCP server; and
  processing instructions for the firewall to stop or block all traffic from the virtual machine.

6. The method of claim 1 further comprising defining, via a manager component and an agent component, a manager-agent relationship.

7. The method of claim 6 wherein the manager component includes and/or is configured to operate with a program that enables a customer, a network administrator, and/or a management component to request and/or provision virtual machines within the network.

8. The method of claim 6 wherein the agent component that provides instructions to the firewall, the agent component being configured to send an instruction to the firewall to lock the virtual machine such that all traffic from the virtual machine is blocked.

9. The method of claim 1 wherein the firewall is configured to monitor and filter traffic at the link layer, prior to routing, via a packet capture mechanism that captures network packets as the network packets travel over the network.

10. The method of claim 9 wherein the packet capture mechanism includes a Linux Kernel pcap.

11. The method of claim 10 wherein the list of rules is defined and/or populated by snooping on flood traffic within network.

12. The method of claim 11 wherein the compute node include a software-based bridge and/or switch that may be configured to include or access the list of rules, wherein the bridge and/or switch is configured to forward, but not route, packets.

13. The method of claim 12 wherein the firewall is configured to monitor traffic through an associated switch, detect undesired traffic, and/or block traffic from a source and/or to a destination in accordance with the list of rules.

14. The method of claim 13 further comprising performing a process of defining the firewall including defining the list of rules such that, in addition to broadcast packets, only packets sent from the media access control (MAC) address of the virtual machine are allowed.

15. A method for handling traffic over a network regarding communications between one or more virtual machines and the network, the method comprising:
  processing information related to enabling or defining, via a compute node, a firewall between the one or more virtual machine and at least a portion of a network;
  processing information related to detecting, via the firewall, undesired traffic based on an Ethernet bridge table associated with communication between the one or more virtual machines and the network; and
  processing information related to controlling a virtual machine in response to the detection of undesired traffic via monitoring and filtering traffic at layer 2 (link layer) during forwarding but prior to routing, including:

detecting a spoof attack of an IP address of another compute node and blocking traffic having data frames or cells that include a MAC address not associated with the virtual machine based on information included in the Ethernet bridge table;

detecting a spoof attack of an IP address of another compute node and blocking traffic having data frames or cells that include an IP address not associated with the virtual machine based on information included in the Ethernet bridge table;

detecting a rogue dynamic host communication protocol (DHCP) attack and blocking traffic having data frames or cells that include a DHCP offer based on information included in the Ethernet bridge table; and stopping the virtual machine and/or blocking all traffic from the virtual machine;

performing processing regarding rebooting the virtual machine after detection of the undesired traffic, the processing including: processing an instruction to the firewall to restart the virtual machine;

processing instructions regarding transmission, by the virtual machine, of a request for a network address to the network;

processing information regarding receipt, by the virtual machine, of a valid response in reply to the request; or processing information regarding transmission, by an agent component, of an instruction to the firewall to lock the IP address with the virtual machine; or any combination thereof;

wherein the undesired traffic is discarded at the virtual hardware level prior to the undesired traffic reaching a switch or another virtual machine within the compute node;

wherein the Ethernet bridge table includes forwarding data associated with communication between the compute node and the virtual machine as well as data associated with other compute node and other virtual machines associate with the other compute nodes;

wherein the firewall is configured to:

allow DHCP requests and virtual machine responses; drop and/or otherwise block DHCP requests from the virtual machine;

inspect DHCP packet headers to determine whether the address of the DHCP packet is valid;

lock the Ethernet bridge table to only deliver packets to and from IP address associated with a valid DHCP address; and lock the Ethernet bridge table to only forward ARP packets from an associated IP address.

16. The method of claim 15 wherein the compute node comprises a manager component and an agent component configured to define a manager-agent relationship.

17. The method of claim 16 wherein the agent component includes and/or is configured to operate with a program that enables a compute node to define virtual machines, firewalls and/or tables.

18. The method of claim 15 wherein the Ethernet bridge table is defined and/or populated by snooping on flood traffic within network.

19. The method of claim 15 wherein the compute node include a software-based bridge and/or switch that may be configured to include or access the Ethernet bridge table, wherein the bridge and/or switch is configured to forward, but not route, packets.

20. The method of claim 15 wherein the firewall is configured to monitor traffic through an associated switch, detect undesired traffic, and/or block traffic from a source and/or to a destination in accordance with the Ethernet bridge table.

21. The method of claim 15 further comprising performing a process of defining the firewall including defining the Ethernet bridge table such that, in addition to broadcast packets, only packets sent from the media access control (MAC) address of the virtual machine are allowed.

22. A system comprising:

a compute node comprising a memory and/or a processing component, the computer node also comprising or having access to a list of rules, the compute node configured to:

define one or more virtual machines;

enable a firewall between at least one virtual machine and at least a portion of a network, the firewall being configured to detect undesired traffic based on the list of rules associated with communication between the at least one virtual machine and the at least a portion of the network;

control the virtual machine in response to the detection of the undesired traffic via monitoring and filtering traffic at layer 2 (link layer) during forwarding but prior to routing, including:

detecting a spoof attack of an IP address of another compute node and blocking traffic having data frames or cells that include a MAC address not associated with the virtual machine based on information included in the list of rules;

detecting a spoof attack of an IP address of another compute node and blocking traffic having data frames or cells that include an IP address not associated with the virtual machine based on information included in the list of rules;

detecting a rogue dynamic host communication protocol (DHCP) attack and blocking traffic having data frames or cells that include a DHCP offer based on information included in the list of rules; and locking, stopping or blocking network traffic to and/or from the virtual machine in response to the firewall detecting the undesired traffic; and perform processing regarding rebooting the virtual machine after detection of the undesired traffic, the processing including:

processing an instruction to the firewall to restart the virtual machine; processing instructions regarding transmission, by the virtual machine, of a request for a network address to the network:

processing information regarding receipt, by the virtual machine, of a valid response in reply to the request; or processing information regarding transmission, by an agent component, of an instruction to the firewall to lock the IP address with the virtual machine; or any combination thereof;

wherein the undesired traffic is discarded at the virtual hardware hardware/machine level prior to the undesired traffic reaching a switch or another virtual machine within the compute node;

wherein the list of rules includes forwarding data associated with communication between the compute node and the virtual machine as well as data associated with other compute node and other virtual machines associate with the other compute nodes;

wherein the firewall is configured to:

allow DHCP requests and virtual machine responses; drop and or otherwise block DHCP requests from the virtual machine;

inspect DHCP packet headers to determine whether the address of the DHCP packet is valid;

lock the list of rules to only deliver packets to and from IP address associated with a valid DHCP address; and lock the list of rules to only forward ARP packets from an associated IP address.

23. The system of claim 22 wherein stopping traffic includes stopping data frames or cells that include a MAC address not associated with the virtual machine.

24. The apparatus of claim 22 wherein the compute node or firewall detects the undesired traffic and blocks the traffic associated with the undesired traffic based on information included in the list of rules.

25. The apparatus of claim 22 wherein the compute node comprises an agent component that provides instructions to the firewall, the agent component being configured to send an instruction to lock the virtual machine such that all traffic from the virtual machine is blocked.

26. The apparatus of claim 22 wherein the compute node is further configured to:
   enable and/or define the firewall on the compute node or on a switch; and/or
   instruct an associated switch to enable and/or otherwise define the firewall.

* * * * *